US007996858B2

United States Patent
Ohira

(10) Patent No.: US 7,996,858 B2
(45) Date of Patent: Aug. 9, 2011

(54) DISK DEVICE

(75) Inventor: Yutaka Ohira, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 504 days.

(21) Appl. No.: 12/233,132

(22) Filed: Sep. 18, 2008

(65) Prior Publication Data
US 2009/0083775 A1 Mar. 26, 2009

(30) Foreign Application Priority Data
Sep. 21, 2007 (JP) ................................ P 2007-244886

(51) Int. Cl.
*G11B 33/02* (2006.01)
(52) U.S. Cl. ............................................. 720/646
(58) Field of Classification Search .................. 720/646
See application file for complete search history.

(56) References Cited

U.S. PATENT DOCUMENTS

| | | | | |
|---|---|---|---|---|
| 6,038,202 A * | 3/2000 | Kanatani et al. | ............... | 720/647 |
| 6,243,333 B1 * | 6/2001 | Kanazawa et al. | ......... | 369/44.11 |
| 6,296,334 B1 * | 10/2001 | Liao | ............................ | 312/223.2 |
| 7,127,728 B2 * | 10/2006 | Kim et al. | ...................... | 720/655 |
| 7,487,519 B2 * | 2/2009 | Jin | ................................. | 720/647 |
| 2003/0081398 A1 | 5/2003 | Tuttle et al. | .................... | 361/818 |
| 2005/0149959 A1 * | 7/2005 | Sasaki et al. | ................... | 720/646 |
| 2005/0204374 A1 * | 9/2005 | Inoue et al. | .................... | 720/646 |
| 2005/0269828 A1 | 12/2005 | Miyamoto | ................... | 296/39.2 |

FOREIGN PATENT DOCUMENTS
JP 2005-327358 11/2005

* cited by examiner

*Primary Examiner* — Mark Blouin
(74) *Attorney, Agent, or Firm* — Morgan, Lewis & Bockius LLP

(57) ABSTRACT

A disk device includes: a front panel; a bottom chassis, including: a bottom plate, having a first end and a second end; and a side plate, formed on the first end, the side plate formed with a first through hole; a connecting member, having a first wall formed with a second through hole and a second wall coupled with the front panel; a hook portion, formed on the first wall so as to extend in a first direction and engaging with the side plate; a screw, fitted into the first through hole and the second through hole thereby coupling the first wall and the side plate; a first engaging member, formed on the side plate; and a second engaging member, formed on the connecting member, and engaging with the first engaging member such that movement thereof in at least the first direction is restricted.

6 Claims, 8 Drawing Sheets

DISK DEVICE

BACKGROUND

1. Field of the Invention

The present invention relates to a disk device, such as a Blu-ray type DVD recorder or DVD player, and particularly concerns a disk device configured to enable a casing assembly work to be performed rapidly and readily.

2. Description of the Related Art

An example of a disk device is shown in a partially cutaway perspective view of FIG. 5, and with this disk device, a main disk device unit 2, constituted, for example, of a main unit of a Blu-ray type DVD recorder or DVD player, and a control circuit board 3, constituted of a printed circuit board, are housed inside a casing 1.

The casing 1 is constituted of a front panel 1A, made of synthetic resin, and a bottom chassis 1B and a top chassis 1C, formed of metal plates, and a connecting frame 5, formed of a metal plate, is latched onto one side plate 1b among side plates 1b and 1c extending upward from respective side edges of a bottom plate 1a of the bottom chassis 1B.

With the main disk device unit 2, a tray 2b for mounting a disk D is disposed in a manner enabling advancing and retreating movements a and b on a loader chassis 2a affixed to the bottom plate 1a of the bottom chassis 1B, and in a tray opening state, the tray 2b is advanced a and made to protrude from a tray entrance/exit 6 of the front panel 1A for removal of the disk D on the tray 2b or placement of a new disk D on the tray 2b. In FIG. 5, 7 is an operating portion, recessedly formed in the front panel 1A, and an opening/closing lid 8 is disposed in a manner enabling opening and closing.

FIGS. 6 to 8 show a conventional connecting frame 5, with FIG. 6 being a longitudinal sectional view of the disk device, FIG. 7 being an exploded perspective view of principal portions of the same, and FIG. 8 being a perspective view of a connecting frame affixing procedure of the principal portions of the same.

As shown in FIGS. 6 and 7, the connecting frame 5 has a longitudinal plate 5a and a lateral plate 5b, extending horizontally from an upper end of the longitudinal plate 5a, a substantially L-shaped hook portion 5c is cut out outward from a rear end edge of the longitudinal plate 5a, a machine screw hole 9 is formed in the longitudinal plate 5a near the hook portion 5c, a recess 10 is formed by bending a portion of the one side plate 1b of the bottom chassis 1B inward in opposition to the machine screw hole 9 and the hook portion 5c, and a penetrating hole 11, opposing the machine screw hole 9, is penetrated through the recess 10.

To describe a procedure of affixing the connecting frame 5, the hook portion 5c is engaged with an upper edge 10a of the recess 10 and a machine screw 12 is screwed by a screwdriver 13 into the machine screw hole 9 via the penetrating hole 11 to affix the connecting frame 5 to the bottom chassis 1B as shown in FIG. 8.

As shown in FIGS. 6 to 8, a plurality (two in the present example) of substantially triangular locking members 15 are cut out from the lateral plate 5b, and a lock hole 17 is penetrated through an elastic tongue member 16, extending rearward from the front panel 1A, in opposition to both locking members 15.

As shown in FIG. 7, a plurality (two in the present example) of substantially triangular locking members 18 are cut out from a front portion of the one side plate 1b of the bottom chassis 1B, and a lock hole 20 is penetrated through an elastic tongue member 19, extending rearward from the front panel 1A, in opposition to both locking members 18.

As shown in FIGS. 6 and 7, an elastically displaceable locking member 21, extending downward toward the rear, is cut out from a front portion of the bottom plate 1a of the bottom chassis 1B, and a lock hole 23 is penetrated through a leg plate 22, extending rearward from the front panel 1A, in opposition to the locking member 21.

As shown in FIG. 5, substantially triangular locking members 2c are integrally protruded from front portions of both side plates of the loader chassis 2a, and locking holes 24a are penetrated through elastic tongue members 24, extending rearward from the front panel 1A, in opposition to both locking members 2c.

To describe an assembly procedure of the casing 1, as shown in FIGS. 5 and 6, by fitting together the respective locking members 2c, 15, 18, and 21 and the respective locking holes 24a, 17, 20, and 23, the front panel 1A is attached to a front portion of the bottom chassis 1B and the top chassis 1C is fitted and affixed to the front panel 1A and the bottom chassis 1B. As a related art, there is that which is described in Japanese Patent Publication No. 2005-327358A.

With the conventional configuration described above, because in the assembly work of the casing 1, the connecting frame 5 is merely latched to the one side plate 1b of the bottom chassis 1B via the hook portion 5c as shown in FIG. 8, when the machine screw 12 is screwed into the machine screw hole 9 of the connecting frame 5 by a screwdriver 13, the connecting frame 5 may retreat in a direction of an arrow c or become raised in a direction of an arrow d as indicated by alternate long and short dash lines and alternate long and two short dashes lines in FIG. 8, and the work of screwing in the machine screw 12 is thus troublesome and there is thus a difficulty in that trouble and time are required in the work of assembling the casing 1.

SUMMARY

It is therefore one advantageous aspect of the invention to provide disk device, with which a casing assembly can be performed rapidly and readily.

According to an aspect of the invention, there is provided a disk device, including: a front panel; a bottom chassis, including: a bottom plate, having a first end and a second end; and a side plate, formed on the first end, the side plate formed with a first through hole; a connecting member, having a first wall formed with a second through hole and a second wall coupled with the front panel; a hook portion, formed on the first wall so as to extend in a first direction and engaging with the side plate; a screw, fitted into the first through hole and the second through hole thereby coupling the first wall and the side plate; a first engaging member, formed on the side plate; and a second engaging member, formed on the connecting member, and engaging with the first engaging member such that movement thereof in at least the first direction is restricted.

According to the above, because by the hook portion, the first engaging member and the second engaging member, the connecting member is positioned and latched to the side plate of the bottom chassis so as not to move accidentally, the screw can be screwed into the first through hole of the connecting member readily and a casing assembly work can thus be performed rapidly and readily.

The first engaging member may be extended from the side plate and bent toward an interior of the bottom chassis, and be formed with an engaging hole. Further, the second engaging member may protrude from the first wall and fitted into the engaging hole.

According to the above, by simply engaging the hook portion with the upper edge of the side plate of the bottom chassis and engaging the second engaging member with the engaging hole in the first engaging member at the bottom chassis side, the connecting member can be positioned and latched to the side plate of the bottom chassis so as not to move accidentally.

The connecting member may include: a third wall, extended from a first end of the first wall; and a fourth wall, extended from g a second end of the first wall which is opposite to the first end. Further, the second wall is extended from the third wall so as to approach the fourth wall.

According to the above, because the connecting member is reinforced by the third wall and the fourth wall, even when, for example, the casing is dropped accidentally, the connecting member can adequately withstand an excessive impact due to the drop and can reliably maintain the state of connection of the front panel and the bottom chassis.

The disk device may further include a jack, fitted into a recess formed in the third wall.

According to the above, because the third wall of the connecting member serves in common as the attaching member of the jack, the number of parts can be reduced and cost reduction can be achieved by an amount corresponding to the portion in common.

BRIEF DESCRIPTION OF THE DRAWINGS

Embodiment may be described in detail with reference to the accompanying drawings, in which.

DETAILED DESCRIPTION OF THE INVENTION

Figure 1:
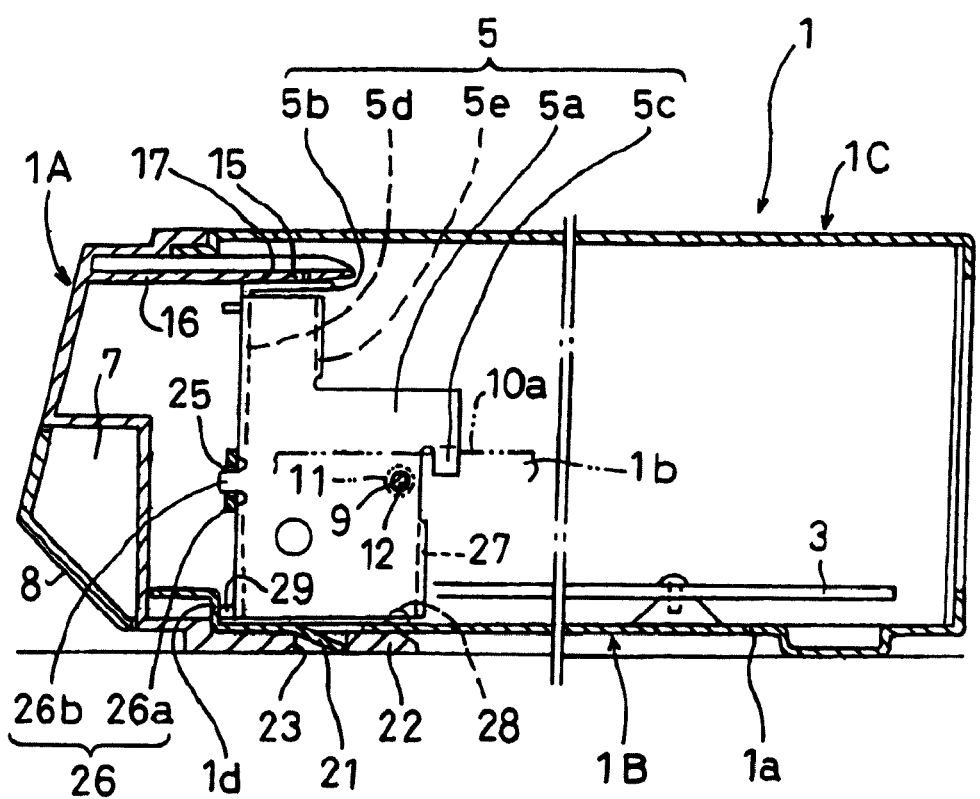
FIG. 1 is a longitudinal sectional view of a disk device that is an embodiment according to the present invention.
Figure 2:
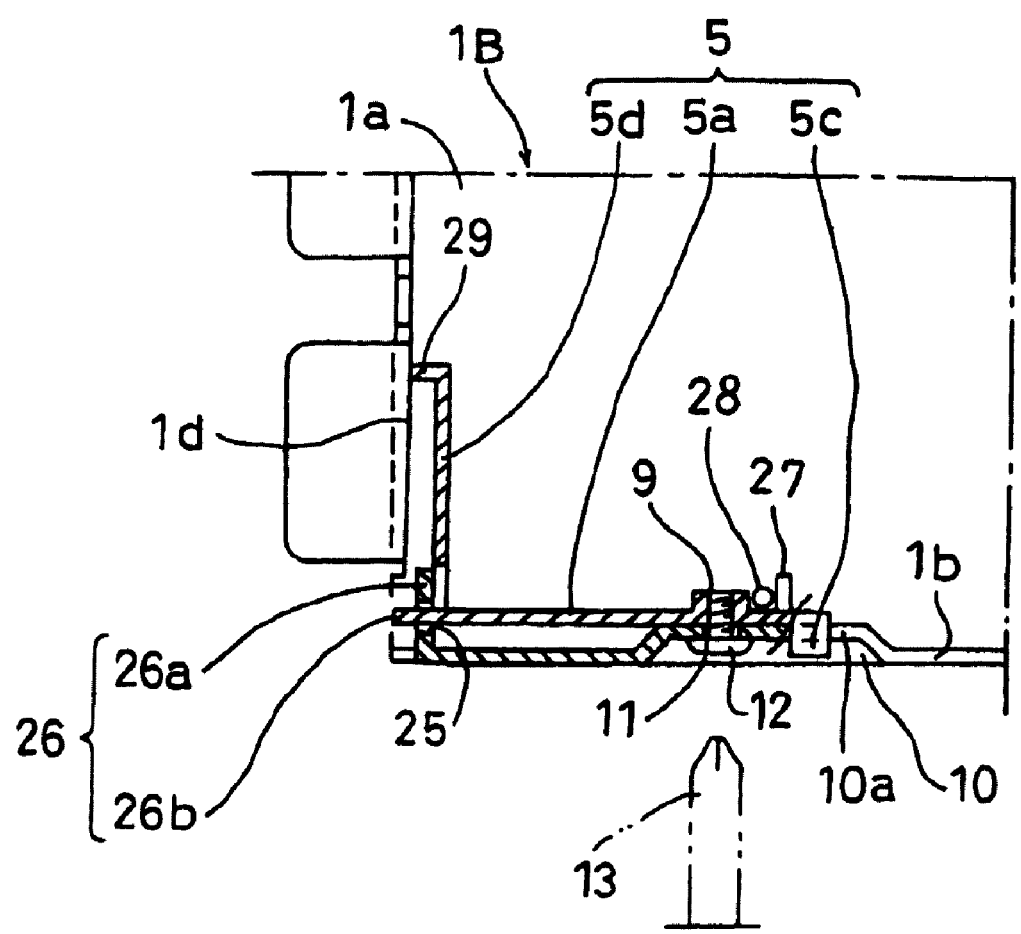
FIG. 2 is an enlarged horizontal sectional view of principal portions of the same.
Figure 3:
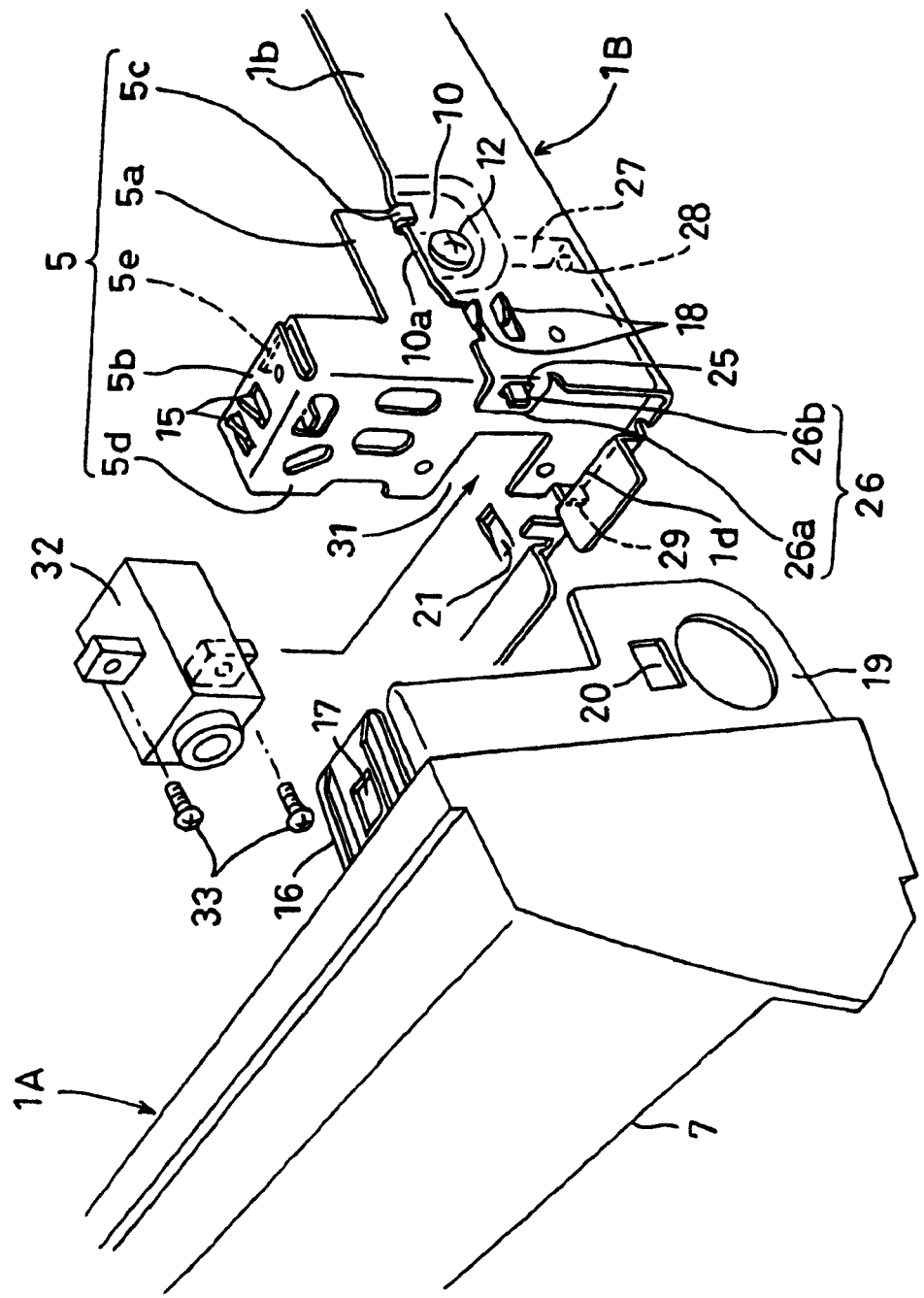
FIG. 3 is an exploded perspective view of the principal portions of the same.
Figure 4:
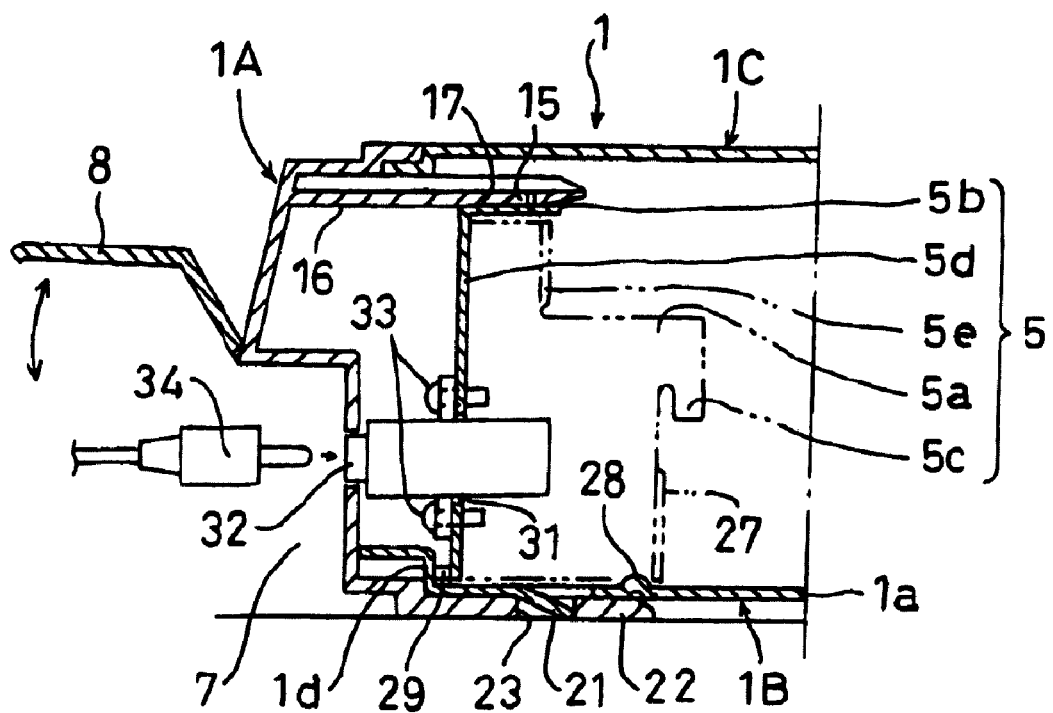
FIG. 4 is a longitudinal sectional view of the principal portions of the same.
Figure 5:
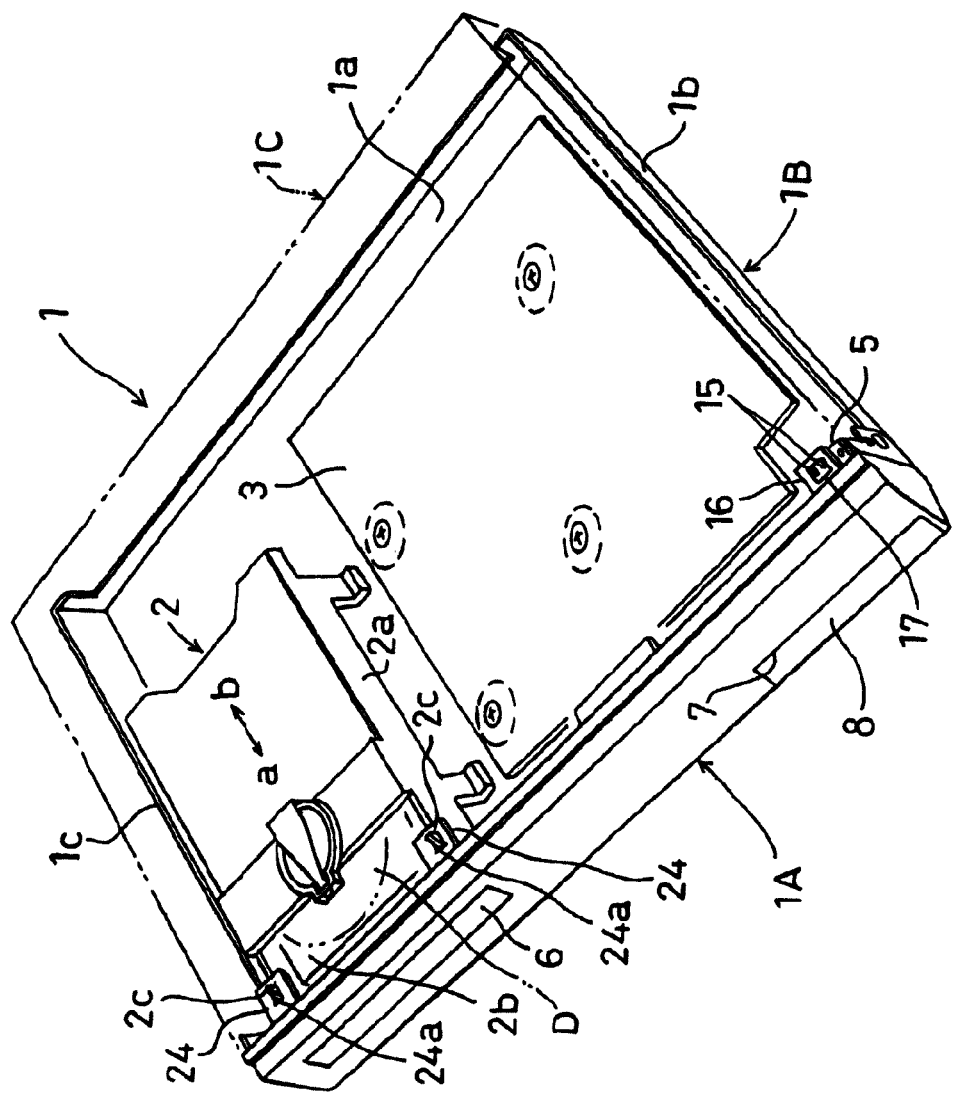
FIG. 5 is a partially cutaway perspective view of an example of a disk device.
Figure 6:
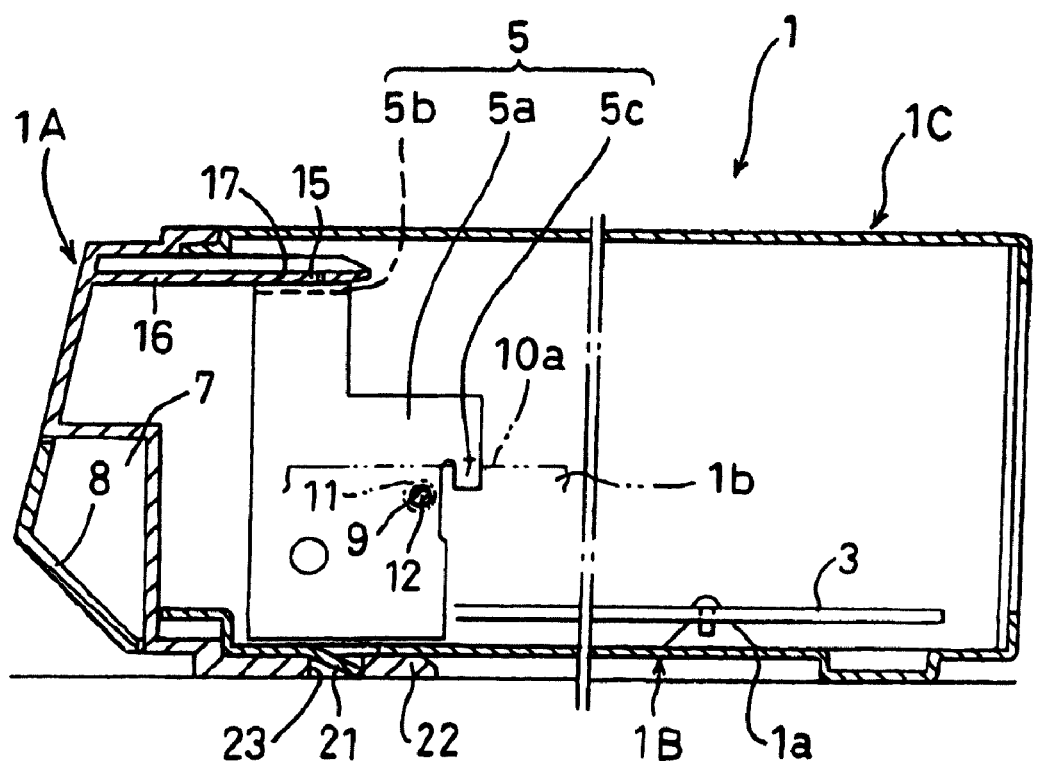
FIG. 6 is a longitudinal sectional view of a conventional example.
Figure 7:
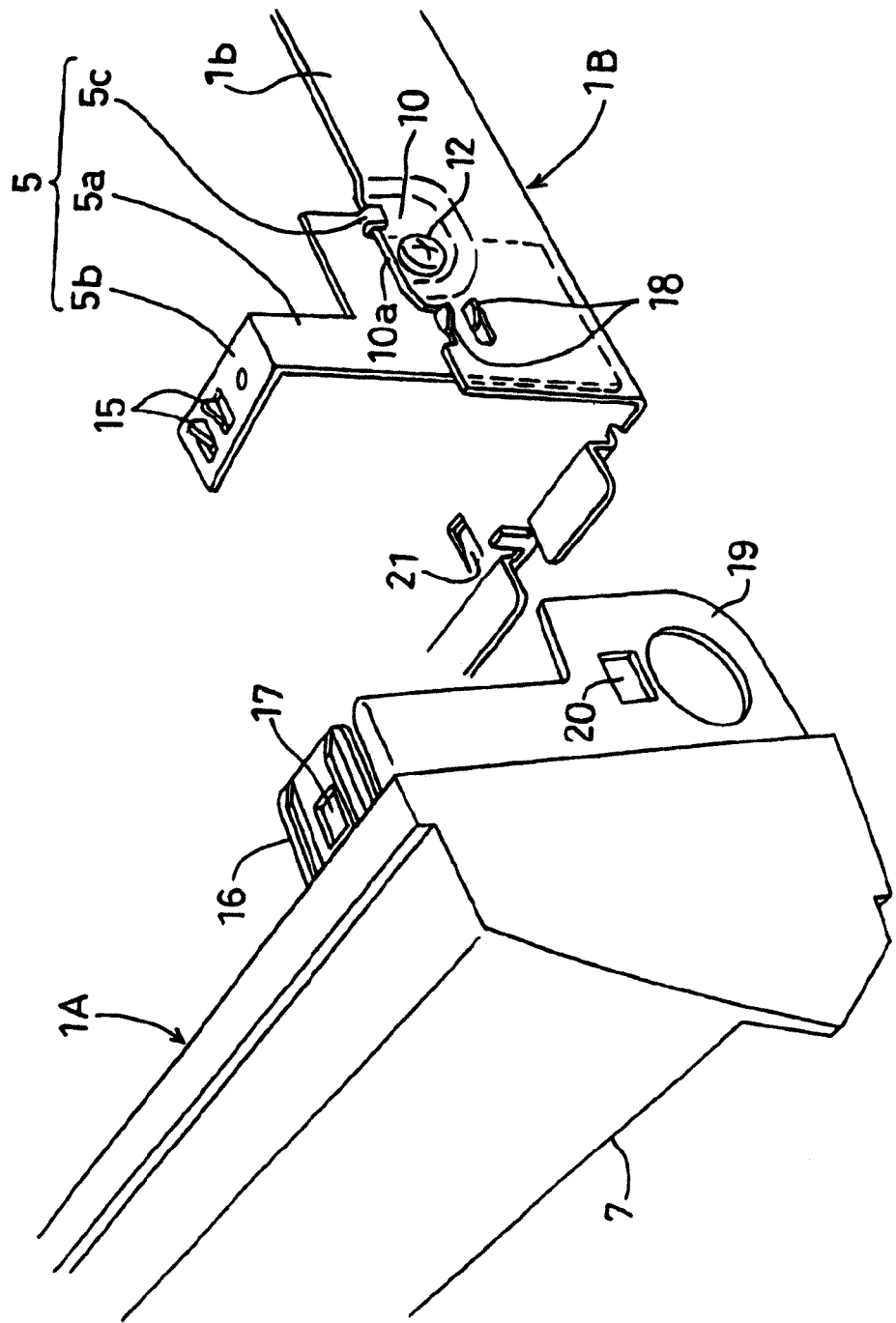
FIG. 7 is an exploded perspective view of principal portions of the same.
Figure 8:
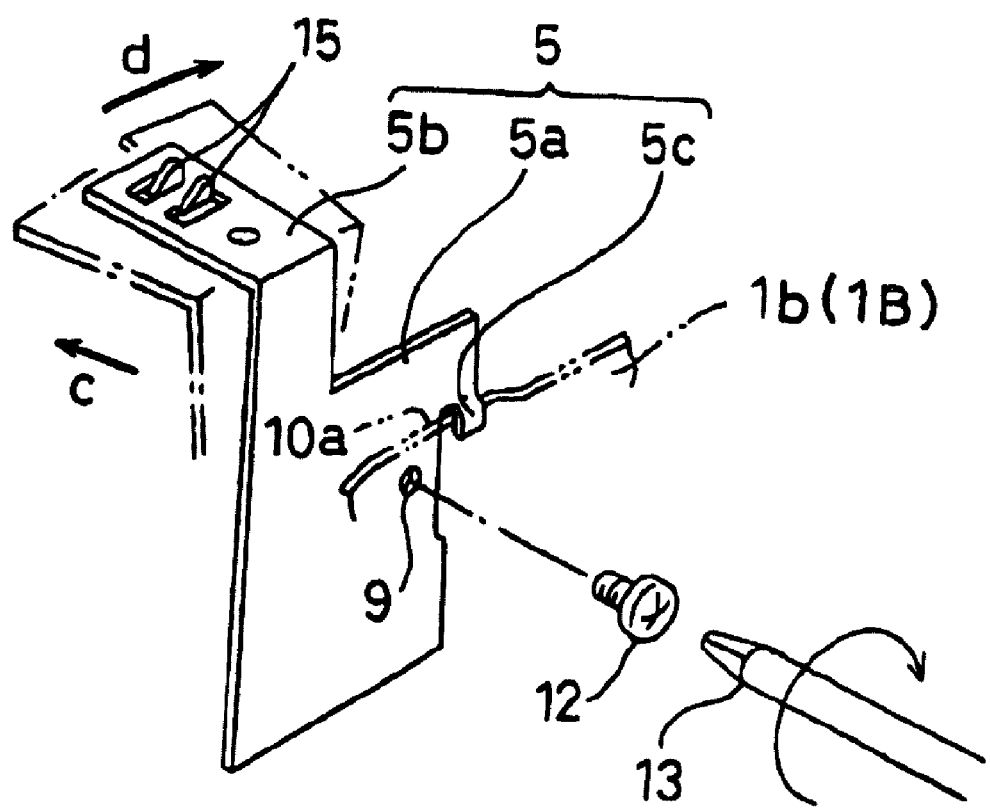
FIG. 8 is a perspective view of a connecting frame affixing procedure of the principal portions of the same.

FIGS. 1 to 4 show a disk device that is an embodiment according to the present invention, with FIG. 1 being a longitudinal sectional view of the same, FIG. 2 being an enlarged horizontal sectional view of principal portions of the same, FIG. 3 being an exploded perspective view of the principal portions of the same, and FIG. 4 being a longitudinal sectional view of the principal portions of the same.

As shown in FIGS. 1 to 3, the connecting frame 5 has a front plate 5d, bent at a right angle from a front end edge of a longitudinal plate 5a, a lateral plate 5b is formed integral to an upper end of the front plate 5d, a rear plate 5e, approaching or contacting a lower surface of the lateral plate 5b, is bent at a right angle from an upper rear end edge of the longitudinal plate 5a, and an engaging metal fitting 26, constituted of a main metal fitting body 26a, formed by bending one side plate 1b of a bottom chassis 1B toward an interior of the bottom chassis 1B and having an engaging hole 25 penetrating through a center thereof, and an engaging member 26b, extended frontward from a front end edge of the longitudinal plate 5a, is provided.

In FIGS. 1 and 2, 27 is a rear end positioning member bent parallel to the rear plate 5e from a lower rear end edge of the longitudinal plate 5a, and a substantially semispherical positioning protrusion 28 is formed by making a bottom plate 1a of the bottom chassis 1B partially protruded upward in opposition to a corner portion between the rear end positioning member 27 and the longitudinal plate 5a. 29 is a front end positioning member bent frontward from a lower end edge of the front plate 5d and is put in contact with a front end plate 1d, cut out and raised from a front end edge of the bottom chassis 1B. Because the configuration besides the above is substantially the same as the configuration shown in FIGS. 5 to 8, portions that are the same are provided with the same symbols and description thereof shall be omitted.

To describe a procedure of affixing the connecting frame 5, as shown in FIG. 2, by engaging the corner portion between the rear end positioning member 27 and the longitudinal plate 5a with the positioning protrusion 28, and putting the front end positioning member 29 in contact with the front end plate 1d, the longitudinal plate 5a is put in contact with the recess 10, the hook portion 5c is engaged with the upper edge 10a of the recess 10, and the engaging member 26b of the engaging metal fitting 26 is engaged with the engaging hole 25 of the main metal fitting body 26a to latch the connecting frame 5 to the one side plate 1b of the bottom chassis 1B as prescribed and the machine screw hole 9 is positioned concentric to the penetrating hole 11 of the one side plate 1b. The machine screw 12 is then screwed by the screwdriver 13 into the machine screw hole 9 via the penetrating hole 11 to affix the connecting frame 5 to the bottom chassis 1B. Thereafter by the same procedure as that of the conventional art, the front panel 1A is attached to the front portion of the bottom chassis 1B and the top chassis 1C is fitted and affixed to the front panel 1A and the bottom chassis 1B.

With the above arrangement, because by the hook portion 5c and the engaging metal fitting 26, constituted of the main metal fitting body 26a and the engaging member 26b, the connecting frame 5 is positioned and latched to the one side plate 1b of the bottom chassis 1B so as not to move accidentally, the machine screw 12 can be screwed into the machine screw hole 9 of the connecting frame 5 readily and a casing assembly work can thus be performed rapidly and readily.

Also, by simply engaging the hook portion 5c to the upper edge 10a of the one side plate 1b of the bottom chassis 1B and engaging the connecting frame 5 side engaging member 26b with the engaging hole 25 in the main metal fitting body 26a at the bottom chassis 1B side, the connecting frame 5 can be positioned and latched to the one side plate 1b of the bottom chassis 1B so as not to move accidentally.

Furthermore, because the connecting frame 5 is reinforced by the front plate 5d and the rear plate 5e, even when, for example, the casing 1 is dropped accidentally, the connecting frame 5 can adequately withstand an excessive impact due to the drop and can reliably maintain the state of connection of the front panel 1A and the bottom chassis 1B.

Although with the above-described configuration, the main metal fitting body 26a of the engaging metal fitting 26 is formed integral to the one side plate 1b of the bottom chassis 1B and the engaging member 26b of the engaging metal fitting 26 is formed integral to the longitudinal plate 5a of the connecting frame 5, the main metal fitting body 26a of the engaging metal fitting 26 may oppositely be formed integral to the longitudinal plate 5a (or front plate 5d) of the connecting frame 5 and the engaging member 26b of the engaging metal fitting 26 may be formed integral to the one side plate 1b of the bottom chassis 1B.

As shown in FIGS. 3 and 4, a jack fitting recess 31 is formed in the front plate 5d of the connecting frame 5, a jack 32 of an earphone, etc., fitted in the jack fitting recess 31, is affixed to the front plate 5d by a machine screw 33, and a plug 34 is inserted into the jack 32 from the operating portion 7, opened by opening the opening/closing lid 8.

With the above arrangement, because the front plate 5d of the connecting frame 5 serves in common as an attaching member of the jack 32, the number of parts can be reduced and cost reduction can be achieved by an amount corresponding to the portion in common.

What is claimed is:

1. A disk device, comprising:
    a front panel;
    a bottom chassis, including:
        a bottom plate, having a first end and a second end; and
        a side plate, formed on the first end, the side plate formed with a first through hole;
    a connecting member, having a first wall formed with a second through hole and a second wall coupled with the front panel;
    a hook portion, formed on the first wall so as to extend in a first direction and engaging with the side plate;
    a screw, fitted into the first through hole and the second through hole thereby coupling the first wall and the side plate;
    a first engaging member, formed on the side plate; and
    a second engaging member, formed on the connecting member, and engaging with the first engaging member such that movement thereof in at least the first direction is restricted.

2. The disk device according to claim 1, wherein:
    the first engaging member is extended from the side plate and bent toward an interior of the bottom chassis, and is formed with an engaging hole; and
    the second engaging member protrudes from the first wall and fitted into the engaging hole.

3. The disk device according to claim 2, wherein:
    the connecting member includes:
        a third wall, extended from a first end of the first wall; and
        a fourth wall, extended from g a second end of the first wall which is opposite to the first end; and
    the second wall is extended from the third wall so as to approach the fourth wall.

4. The disk device according to claim 3, further comprising a jack, fitted into a recess formed in the third wall.

5. The disk device according to claim 1, wherein:
    the front panel is comprised of synthetic resin.

6. The disk device according to claim 1, wherein:
    the bottom chassis is comprised of metal.

* * * * *